United States Patent
Dreibholz et al.

(10) Patent No.: US 7,104,922 B2
(45) Date of Patent: Sep. 12, 2006

(54) METHOD AND DEVICE FOR CONTROL OF A SHIFTING COMPONENT OF A STEPPED AUTOMATIC TRANSMISSION

(75) Inventors: Ralf Dreibholz, Meckenbeuren (DE); Michael Ebenhoch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/756,933

(22) Filed: Jan. 14, 2004

(65) Prior Publication Data
US 2004/0152563 A1    Aug. 5, 2004

(30) Foreign Application Priority Data
Feb. 1, 2003    (DE)    ................ 103 04 050

(51) Int. Cl.
*B60W 10/02*    (2006.01)
*F16H 3/38*    (2006.01)
*F16D 47/00*    (2006.01)

(52) U.S. Cl. ............... 477/79; 74/339; 192/48.3

(58) Field of Classification Search ........... 477/79, 477/80; 74/336 R, 340, 344, 339, 333, 335; 192/48.3, 48.5, 48.7, 53.1, 53.2, 53.5
See application file for complete search history.

(56) References Cited

U.S. PATENT DOCUMENTS

| | | | |
|---|---|---|---|
| 1,937,234 A * | 11/1933 | Lansing | 192/48.5 |
| 3,508,450 A * | 4/1970 | Richards | 74/340 |
| 4,726,245 A * | 2/1988 | Klaue | 74/336 R |
| 6,427,550 B1 * | 8/2002 | Bowen | 74/336 R |
| RE38,615 E * | 10/2004 | Dresden et al. | 74/336 R |
| 6,889,570 B1 * | 5/2005 | Kayano et al. | 74/339 |
| 6,896,641 B1 * | 5/2005 | Matsumura et al. | 477/115 |

FOREIGN PATENT DOCUMENTS

| | | |
|---|---|---|
| DE | 100 60 699 A1 | 6/2001 |
| DE | 199 62 854 A1 | 7/2001 |

* cited by examiner

*Primary Examiner*—Roger Pang
(74) *Attorney, Agent, or Firm*—Davis & Bujold, P.L.L.C.

(57) ABSTRACT

The control of a shifting component (1) of a stepped automatic transmission is designed with one frictionally engaged element (2) and one form-locking element (3). When this shifting component (1) is engaged, a transmitting capacity of the frictionally engaged element (2) is first adjusted and when a synchronous state of the form-locking element (3) exists, the form-locking element (3) is closed. When the form-locking element (3) is closed, a transmitting capacity of the frictionally engaged element (3) is reduced. In case of a demand for disengaging the shifting component (1) before opening under load, the form-locking element (3) and the transmitting capacity of the frictionally engaged element (2) is increased so that a power flow, which is conveyed via the closed form-locking element (3) of the shifting component (1), can be conveyed via the frictionally engaged element when the form-locking element (3) is open.

13 Claims, 2 Drawing Sheets

METHOD AND DEVICE FOR CONTROL OF A SHIFTING COMPONENT OF A STEPPED AUTOMATIC TRANSMISSION

This application claims priority from German Application Serial No. 103 04 050.1 filed Feb. 1, 2003.

FIELD OF THE INVENTION

The invention relates to a method and a device for control of a shifting component of a stepped automatic transmission.

BACKGROUND OF THE INVENTION

From the practice, stepped transmission are known which are operated either partially automated or fully automated wherein one automatic cycle of a gear change by the stepped transmission particularly results in relief of the driver. Especially in fully automated selector transmissions or stepped automatic transmissions, control operations like "uncoupling/starting" and "gear change" are carried out automatically according to established or adaptive programs. For reasons of comfort, it has been changed to carrying out gear changes without noticeable interruption of traction.

Such stepped automatic transmissions, where the transition from one ratio step to another is executed without interruption of the power flow in a drive line, are also designated as force-locking transmissions or powershift transmissions. Additional brake and clutch components of the powershift transmissions make a coupling of the ratio steps under load possible. In a powershift, the step to be discontinued is uncoupled from the positive engagement while the new step is coupled parallel therewith in the power flow of the stepped automatic transmission. A drop in traveling speed advantageously does not occur materially during power shifts since the gear to be engaged is connected with the transmission shaft positively and without drop of the drive torque.

The added brake and clutch components are designed as frictionally engaged shifting elements, such as belt brakes, multi-disc brakes or multi-disc clutches since, with said elements, it is possible to carry out so-called overlapping gear shifts because of the variable transmitting capacity.

The shifting components of the powershift transmission, designed as multi-disc brakes or multi-disc clutches, are controlled via a hydraulic control system with a pressure medium source. The pressure medium source or hydraulic pump of the stepped automatic transmission is also provided for oil supply of a stepped automatic transmission; the hydraulic energy produced by the hydraulic pump is used for closing and retaining the multi-disc brakes or multi-disc clutches, the same as for supplying the stepped automatic transmission with lubricant. A power intake of the hydraulic pump is essentially determined by the oil amount delivered and the hydraulic pressure needed for control of the powershift transmission.

It is disadvantageous that the hydraulic pump of a stepped automatic transmission constitutes an essential source of loss, the energy losses on the side of the hydraulic pump being particularly very high when power shift elements of a stepped automatic transmission are loaded with its closing pressure or retaining pressure so as to keep them in closed state with a high transmitting capacity.

The task of the instant invention is to make a method and a device available for controlling a shift component of a stepped automatic transmission with which gear shifts can be carried out free of interrupted traction and with which energy losses of a stepped automatic transmission can be reduced.

SUMMARY OF THE INVENTION

With the inventive method, when the form-locking element of the shifting component is closed, a transmitting capacity of the frictionally engaged element is reduced, it is advantageously possible to reduce an operating force acting upon the frictionally engaged element or to shift the frictionally engaged element without force.

Therefrom results the advantage that a power intake of a hydraulic pump of the hydraulic system is reduced and power losses are decreased. At the same time a degree of efficiency, regarding an energy requirement of a stepped automatic transmission, is increased by reducing the power intake of the hydraulic pump, which acts positively on a fuel consumption when used in a motor vehicle, for example.

The inventive method further offers the advantage that gear shifts can be executed via the shifting component with a frictionally engaged element and a form-locking element, since engagement and disengagement of the shifting component can be carried out, respectively, with variable transmitting capacity via the frictionally engaged element whereby an interruption of a torque flow is not required in the stepped automatic transmission. The engagement or the disengagement of the shifting component or the control of a gear change in a stepped automatic transmission occurs in a manner known as using conventional frictionally engaged shifting components.

Only a control of the frictionally engaged element between an engaging phase and a disengaging phase, the same as the control of the additional form-locking element differ from hitherto known shifting cycles and thus the inventive method can be easily implemented in an existing control system.

With the inventive device, it is possible to adjust a transmitting capacity of a shifting component of a stepped automatic transmission in engaged state via the form-locking element kept in closing position by the actuation system and, at the same time, to open the frictionally engaged element. Thereby is given the entire transmitting capacity of the shifting component with an operating energy requirement substantially lower compared to the frictionally engaged element.

Determined by the use of the device for control of an inventive shifting component there further results of it being possible, during a shifting cycle, to carry out the advantage of a controlled transmission between the frictional engagement of the frictionally engaged element and the positive fit of the form-locking element whereby in a stepped automatic transmission, on one hand, gear shifts free of traction interruption are possible and, on the other, energy losses of the stepped automatic transmission are reduced.

BRIEF DESCRIPTION OF THE DRAWINGS

The invention will now be described, by way of example, with reference to the accompanying drawings in which.

DETAILED DESCRIPTION OF THE INVENTION

Figure 1:
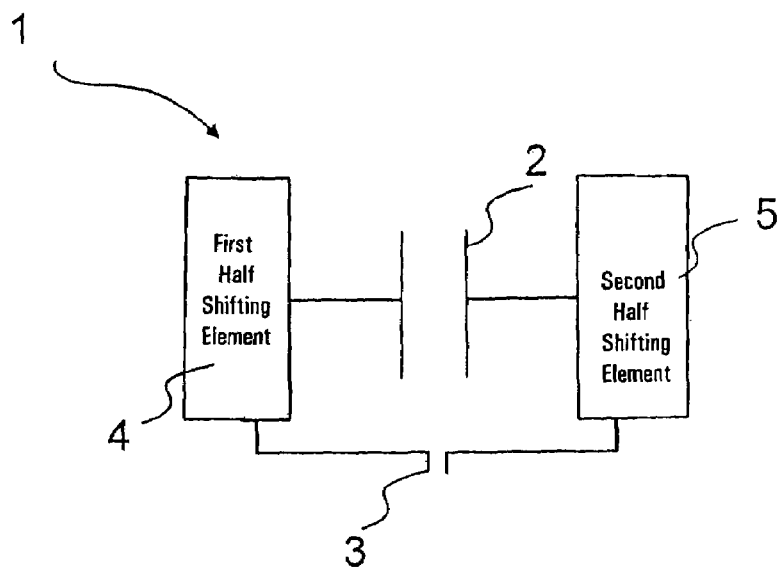
FIG. 1 is a schematic graph of a shifting component with a frictionally engaged element and a form-locking element.

In FIG. 1 is schematically shown a shifting component 1 of a stepped automatic transmission (not shown in detail) for a vehicle and which can be used to adjust one or more gear steps of the stepped automatic transmission. To that end, the shifting component is controlled and engaged or disengaged in combination with other shifting components of the stepped automatic transmission so as to bring in one power flow of different pairs of gears of the stepped automatic transmission.

The shifting component 1 is formed by one frictionally engaged element 2 and one form-locking element 3, a torque being passed in engaged state of the shifting component from a first half 4 of the shifting component to a second half 5 of the shifting component or viceversa.

The first half 4 of the shifting component and the second half 5 of the shifting component and the rotatable or non-rotatable parts of the stepped automatic transmission connected therewith are shown schematized in FIG. 1 as function blocks or as rectangular members. When the shifting component 1 is closed, the power flow is passed via the frictionally engaged element 2, the form-locking element 3 or 4 simultaneously via the frictionally engaged element 2, and the form-locking element 3 from the first half 4 of the shifting component to the second half 5 of the shifting component.

The frictionally engaged element 2 and the form-locking element 3, here designed as dog clutch, can be controlled via a control device (not shown in detail) of the stepped automatic transmission during a shifting cycle of the shifting component 1 so that an engagement and a disengagement without traction interruption, that is, as a powershift, can be carried out. By the expression "shifting cycle" is to be understood here that the chronological sequence of an engagement phase of the shifting component of a power flow transmission phase attached thereto via the shifting component 1, and a disengagement phase again attached thereto of the shifting component 1.

During a shifting cycle a controlled transition occurs between frictionally engaged and form-locking power transmission of a torque outcropping on the shifting component 1, a gear change being carried out during a gear shift without traction interruption, as preferred in case of traction downshifts or coasting upshifts.

The shifting component 1, having in addition to a locking element (not shown in detail) which similarly to synchronizations known per se of stepped transmissions, is designed in the sense that the positive engagement of the form-locking element 3 cannot be produced prior to achieving the synchronous state of the shifting component 1 or of the form-locking element 3.

Figure 2:
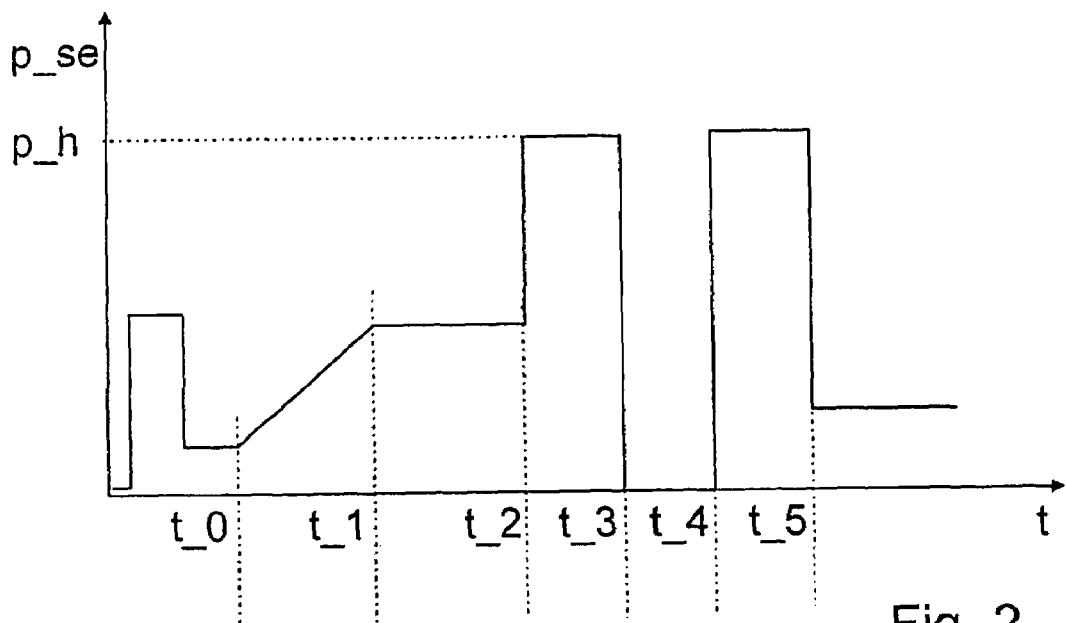
FIG. 2 is a schematic curve in the course of time of a control pressure shutting on the frictionally engaged element during a shifting cycle.
Figure 3:
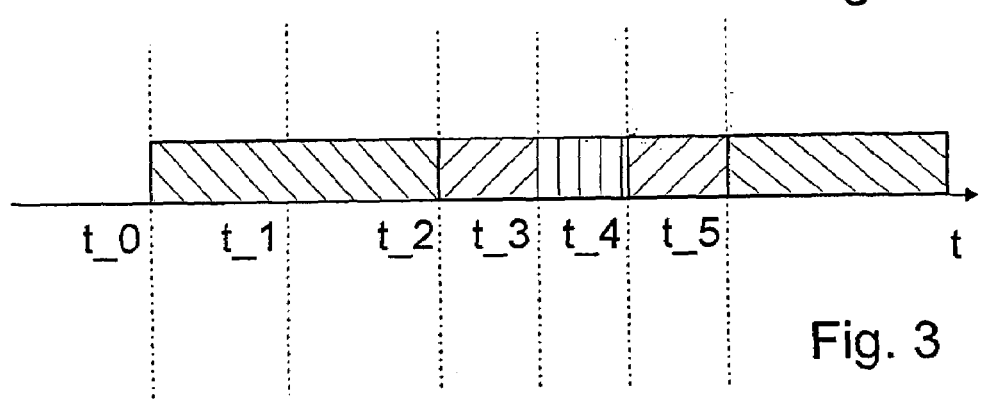
FIG. 3 is a graph corresponding to the pressure curve of FIG. 2 which reproduces different states of the shifting component during the shifting cycle.
Figure 4:
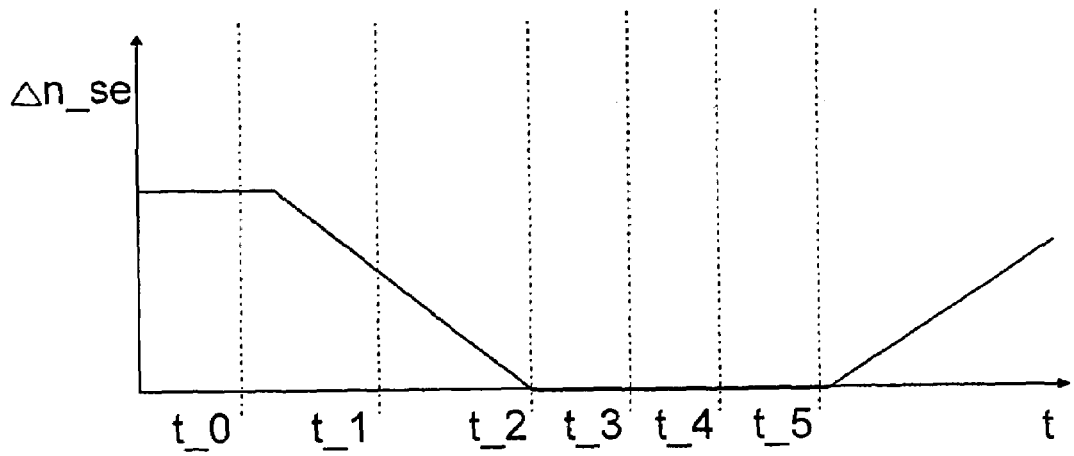
FIG. 4 is a curve in the course of time of a differential rotational speed between a first half of a shifting component and a second half of a shifting component during a shifting cycle.

Herebelow is described, in detail, with reference to FIG. 2, FIG. 3 and FIG. 4, the sequence of a shifting cycle of the shifting component 1 and of the states existing at the same time of the shifting component 1, the same as of the frictionally engaged element 2 and of the form-locking element 3.

With the curve of the control pressure p_se (shown in FIG. 2) correspond the graphs shown in FIG. 3 and FIG. 4, there being graphically reproduced in FIG. 3 different states of the shifting component 1 or of the frictionally engaged element 2 and of the form-locking element 3 during a shifting cycle. By the expression "state" (Zustand) is to be understood at all times as a transmitting capacity of the frictionally engaged element 2 and of the form-locking 3, the same as the manner in which a power flow is conveyed via the shifting component 1. FIG. 4 shows a curve of a differential rotational speed $\Delta n\_se$ between the first half 4 of the first shifting component and the second half 5 of the shifting component 1 during a shifting cycle.

Referring to FIG. 2, it shows a curve in the course of time t of a pressure or of a control pressure p_se of the shifting component 1 designed as multi-disc clutch and which is applied by a hydraulic pump of a hydraulic system of the stepped automatic transmission during a shifting cycle to the frictionally engaged element 2 designed here as a disc set of the multi-disc clutch 1. In this case, both halves 4 and 5 of the shifting component are each connected with rotatable transmission parts such as shafts, gear wheels or rotatable parts of planetary gear sets.

Differing from this, it can obviously be provided that the shifting component is designed as a multi-disc brake and, for production of a gear step of the stepped automatic transmission, an abutting torque is supported against a transmission housing or any other non-rotatable transmission part (not shown), via the force-locking disc set or via the form-locking element of the shifting component. One half of the shifting component is then connected with rotatable transmission parts and the other half of the shifting component with non-rotatable transmission parts.

Prior to a moment t_0, all functional parts of the shifting component 1, that is, the frictionally engaged element 2, and the form-locking element 3 are open and no torque can be passed via the shifting component.

Between the moment t_0 and a moment t_1, the control pressure p_se of the shifting component 1 is steadily raised via a pressure ramp whereby a transmitting capacity of the frictionally engaged element or of the disc set 2 is increased and converted to a slip state.

Starting from a moment not specified between the two moments t_0 and t_1, due to the increased transmitting capacity of the frictionally engaged element 2, the differential rotational speed $\Delta n\_se$ is steadily reduced and at a moment t_2 reaches the value 0. When the differential rotational speed $\Delta n\_se$ between the two halves 4 and 5 of the shifting component 1 is equalized, the frictionally engaged element 2 and the form-locking element 3 are synchronized.

The control pressure p_se is kept at least approximately constant between the moment t_1 and the moment t_2. The at least approximately constant curve of the control pressure p_se constitutes, prior to the moment t_0, a so-called pressure compensation phase of a hydraulic actuation system that controls the frictionally engaged element 2 and to which is added one so-called rapid filling phase of the actuation system.

At the moment t_2, when the synchronous state of the shifting component 1 has been achieved, the control pressure pose is raised by leaps to a retaining pressure p_h of the shifting component 1 so that the disc set 2 is extruded or frictionally connected so that a torque abutting on the shifting component 1 is entirely transmitted via the frictionally engaged element 2 from the first half 4 to the second half 5 of the shifting component.

In this state of the shifting component 1, the control device of the powershift transmission issues a signal in order to close the form-locking shifting component 3. The closing process of the form-locking element 3 is terminated at the latest at the moment t_3 and the control pressure p_se of the frictionally engaged element 2 is reduced to the pressure level at the moment t_0. Thereby the transmitting capacity of the frictionally engaged element 2 is increased by opening the disc set.

In a subsequent shifting phase of the shifting cycle, that is, between the moment t_3 and the moment t_4, a torque abutting on the shifting component 1 is transmitted via the shifting component 1 by the positive fit of the form-locking element 3.

It is obviously at the discretion of those skilled in the art to entirely cancel the transmitting capacity of the frictionally engaged shifting component when the form-locking element 3 of the shifting component is closed or to lower it to a defined threshold value. The incomplete cancellation of the transmitting capacity compared to the complete lowering of the transmitting capacity of the frictionally engaged element offers the advantage that an increase of the transmitting capacity departing from the threshold value up to the complete positive engagement of the frictionally engaged element is practicable within a brief control time.

If at the moment t_4, depending on a specific operating state of the stepped automatic transmission or on a given driver's wish, there is a demand for a gear change and instructions for disconnecting the shifting component 1, before opening the form-locking element 3, the control pressure p_se of the frictionally engaged shifting component is again raised by leaps to the retaining pressure p_h so that the frictionally engaged element 2 be fully closed.

In this state of the frictionally engaged element 2 of the shifting component 1, the form-locking element 3 is released by opening the positive fit and the torque abutting on the shifting component 1 is transmitted by the frictionally engaged element 2 with the same magnitude as via the form-locking element 3.

At a moment t_5, when the full transmitting capacity of the frictionally engaged shifting component 2 reliably exists and at the same time, the form-locking element 3 is reliably open, the control pressure p_se of the shifting component is reduced by leaps to a preset pressure value. Thereby the transmitting capacity of the frictionally engaged element 2 is reduced and converted to a slip operation or slip phase. The differential rotational speed Δ n_se simultaneously rises to a value which adjusts to the shifting component 1 according to the new gear introduced or the new gear step of the automatic transmission.

The shaded areas shown in FIG. 3 each represent a certain state of the shifting component 1 during a shifting phase. The first shaded area between moments t_0 and t_2 represents here the state of the shifting component 1 in which a power flow is transmitted by the shifting component 1 via the frictionally engaged element 2 during a slip operation of the frictionally engaged element.

A second shaded area located between the moments t_2 and t_3 represents the state of the shifting component 1 during which the frictionally engaged element 2 is fully closed and a complete frictional connection without slip exists between the friction areas of the frictionally engaged element 2. A torque abutting on the shifting component 1 is tensionally transmitted at the same time, via the frictionally engaged element 2. During this shifting phase the form-locking element 3 is closed.

The form-locking element 3 is closed at the latest moment t_3 and again opened at the earliest moment t_4 when the frictionally engaged element is already at its full transmitting capacity at moment t_4.

In FIG. 3 is shown a third shaded area located between the moments t_3 and t_4 representing the state of the shifting component 1 where a torque abutting on the shifting component 1 is positively transmitting by the shifting component 1 and the frictionally engaged element 2 is fully open or, alternatively, has only an extensively reduced transmitting capacity compared to the force-locking state.

In the shifting phase of the shifting cycle between the moments t_4 and t_5, the frictionally engaged element 2 is again tensionally closed and the form-locking element 3 is opened. Abutting on the shifting component 1, a torque is relayed by the shifting component 1 via the tensionally closed frictionally engaged element 2.

Starting from the moment t_5, the transmitting capacity of the frictionally engaged element 2 is reduced and a torque abutting on the shifting component 1 is transmitted by the frictionally engaged element 2 slippingly with reduced transmitting capacity. In this state of the shifting component 1, a magnitude of the torque transmitted, via the shifting component 1, is adjusted via a controlled adjustable transmitting capacity of the frictionally engaged element 2.

Figure 5:
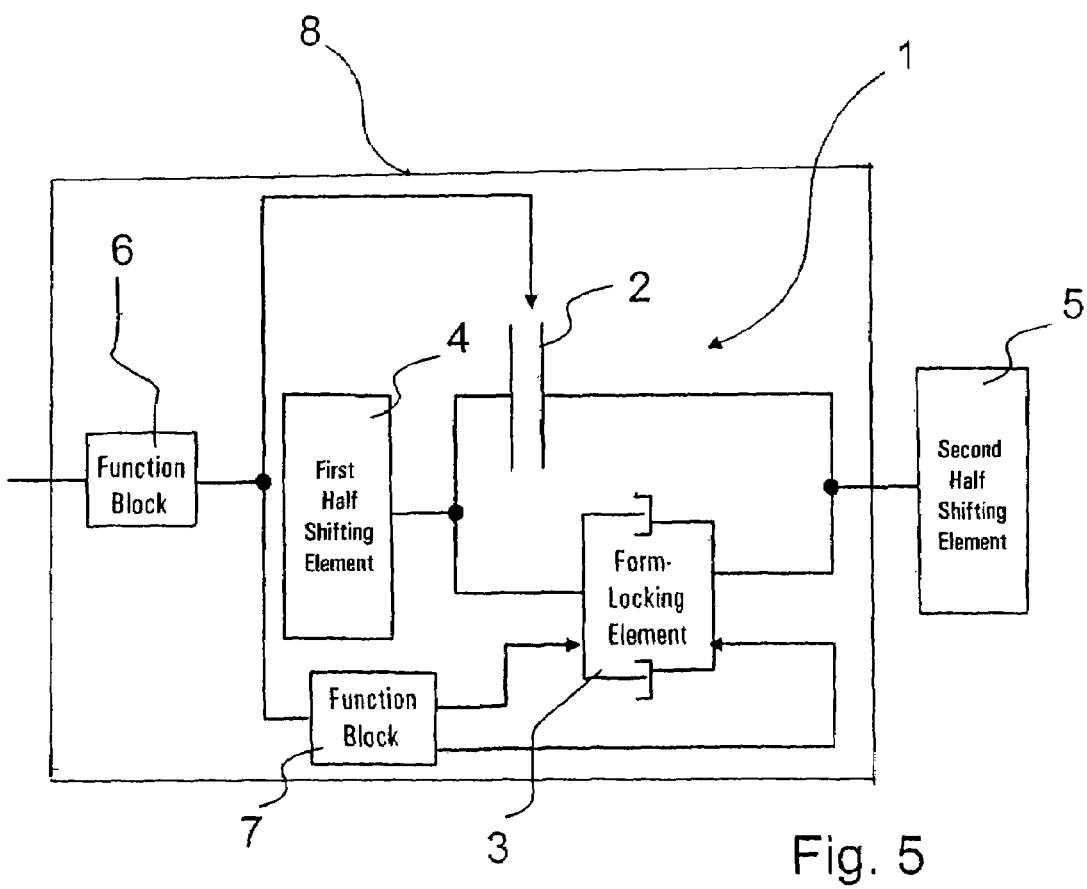
FIG. 5 is a diagram of an actuation system for control of the frictionally engaged element and of the form-locking element.

FIG. 5 shows a switching diagram of a device for the control of the shifting component 1 having an actuation system 8 for actuation of the shifting component with which a controlled transition can be carried out between the positive fit of the form-locking element 3 and the frictional fit of the frictionally engaged element 2 during a powershift cycle. The function block 6 symbolically represents device_ here, preferably a hydraulic system of a stepped automatic transmission with a hydraulic pump, originating from which an operating energy can be applied to the shifting component 1 or to the frictionally engaged element 2 and to the form-locking element 3.

The operating energy for the frictionally engaged element 2 is applied by the actuation system 8 directly to the frictionally engaged element 2 whereas the operating energy for control of the form-locking element 3 is first passed to a second function block 7 and only therefrom to the form-locking element 3.

The function block 7 is designed with a mathematical logic which, upon actuation of the frictionally engaged element 2, alternatively triggers an opening (disengagement) or a closing of (engagement) the form-locking element. This means that the actuation of the frictionally engaged element 2 between the moments t_0 and t_3 in the second function block 7, designed here as flip-flop shift (toggle), combined with the mathematical logic of the function block 7 produces a closing of (engagement) the form-locking element 3 at the moment t_3. The repeated actuation or pressurization of the frictionally engaged element 2 with the retaining pressure p_h results in the opening (disengagement) of the form-locking element 3 at moment t_4.

Thus, at the moment t_5, exists the above described state of the shifting component 1 and a transmitting capacity of the shifting component 1 can be adjusted in a manner known per se by reducing the transmitting capacity of the frictionally engaged element 2. A transmitting capacity of one other powershift element to be engaged of the stepped automatic transmission 1 can be simultaneously adjusted without traction interruption.

The above described actuation strategy of the actuation system 8 results in that both components of the shifting component 1, that is, the frictionally engaged element 2 and the form-locking element 3, can be controlled by a common actuator or a common actuation system whereby installation space is advantageously saved and, in addition, an economical production of the stepped automatic transmission is ensured.

A possible structural development of one part of the actuation system, which is provided for alternative actuation of the form-locking element 3, constitutes a hoisting element connected with the form-locking element 3 and upon which acts the operating pressure of the hydraulic system of the stepped automatic transmission for the frictionally engaged element 2.

The hoisting element tiltably hinged on a fulcrum and connected with the form-locking element so that every control of the hoisting element is alternatively applied with the operating pressure to one end of the hoisting element whereby either a closing or an opening of the form-locking element 3 results in the above described way.

With the above described inventive method, it is possible in stepped automatic transmission to carry out overlapping gear shifts known per se under load and without traction interruption. Besides, when engagement of a shifting component to be engaged is terminated, an operating pressure or a closing force, respectively, for a frictionally engaged element and a frictionally engaged shifting component of a stepped automatic transmission can be advantageously reduced improving an efficiency of a stepped automatic transmission.

REFERENCE NUMERALS 1 shifting component
2 frictionally engaged element
3 form-locking element
4 first half of the shifting component
5 second half of the shifting component
6 first function block
7 second function block
8 actuation system
$\Delta$ n_se differential rotational speed
p_h retaining pressure
p_se control pressure
t time
t_0 to t_5 moment

The invention claimed is:

1. A method for control of a shifting component of a stepped automatic transmission, the shifting component (1) having at least one frictionally engaged element (2) and at least one form-locking element (3) for transmitting power from a first half of the shifting component to a second half of the shifting component, and a common actuator for controlling actuation of both the frictionally engaged element (2) and the form-locking element (3), the method comprising the steps of:

adjusting a transmitting capacity of the at least one frictionally engaged element (2), upon engagement of said shifting component (1), by actuating a first function block (6) directly communicating with the frictionally engaged element (2), and the first function block (6) communicates with a second function block (7);

engaging the form-locking element (3), via the second function block (7) which triggers engagement and disengagement of the form-locking element (3) only once a synchronous state for the shifting component (1) exists;

reducing the transmitting capacity of the frictionally engaged element (2), once said form-locking element (3) is engaged, so that the power is transmitted from the first half of the shifting component to the second half of the shifting component solely via said form-locking element (3) and upon a demand to disengage the at least one shifting component (1), increasing the transmitting capacity of the frictionally engaged element (2) prior to disengagement of the form-locking element (3) under load so a power flow, which is conveyed via the engaged form-locking element (3) of the shifting component (1), is conveyed via the frictionally engaged element (2) when the form-locking element (3) is disengaged.

2. The method according to claim 1, further comprising the step of adjusting the transmitting capacity of said frictionally engaged element (2) upon engagement of said shifting component (1) via a slip phase of said frictionally engaged element (2).

3. The method according to claim 1, further comprising the step of adjusting the transmitting capacity of said frictionally engaged element (2) to a defined threshold value when said form-locking element (3) is engaged.

4. The method according to claim 1, further comprising the step of reducing the transmitting capacity of said frictionally engaged element (2) upon disengagement of said shifting component (1), after disengagement of said form-locking element (3) during a slip phase.

5. The method according to claim 1, further comprising the step of designing the frictionally engaged element (2) of said shifting component (1) as one of a multi-disc clutch and a multi-disc brake.

6. The method according to claim 1, further comprising the step of designing said form-locking element (3) as a dog clutch.

7. The method according to claim 1, further comprising the step of providing the second function block (7) with a mathematical logic which triggers engagement and disengagement of the form-locking element (3).

8. A device for control of a shifting component (1) of a stepped automatic transmission during a shifting cycle, wherein said shifting component (1) has a frictionally engaged element (2) and a form-locking element (3) for transmitting power from a first half of the shifting component to a second half of the shifting component, both the frictionally engaged element (2) and the form-locking element (3) are actuated via an actuation system (8) to facilitate transmission of torque, said shifting component (1) is controlled via said actuation system (8) so that a transmitting capacity of said shifting component (1) is adjusted such that, in an engaged state, the power is transmitted via at least one of said frictionally engaged element (2) and said form-locking element (3) from a first half of the shifting component to a second half of the shifting component;

wherein, upon engagement of said shifting component (1), a first function block (6), directly communicating with the frictionally engaged element (2), adjusts a transmitting capacity of the frictionally engaged element; and the first function block (6) communicates with a second function block (7), and the second function block (7) triggers engagement and disengagement of the form-locking element (3) only once a synchronous state for the shifting component (1) exists.

9. The device according to claim 8, wherein said frictionally engaged element (2) is disengaged via said actuation system (8) once said form-locking element (3) is engaged and the shifting component (1) is engaged.

10. The device according to claim 8 wherein said form-locking element (3) is engaged via said actuation system (8) once said frictionally engaged shifting component (2) is engaged.

11. The device according to claim 8 wherein said actuation system (8) is designed such that at any time, a control of said frictionally engaged element (2) leads to the engagement alternating with disengagement or engagement of said form-locking element (3).

12. The device according to claim 8, wherein said frictionally engaged element (2) is loaded directly and said form-locking element (2) via a flip-flop shift, with the operating energy required for control.

13. The device according to claim 8, wherein the second function block (7) has a mathematical logic which triggers engagement and disengagement of the form-locking element (3).

* * * * *